(12) United States Patent
Zhang et al.

(10) Patent No.: US 8,213,600 B2
(45) Date of Patent: *Jul. 3, 2012

(54) SLIDING MECHANISM

(75) Inventors: Yu Zhang, Shenzhen (CN); Guo-Zhao Huang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 629 days.

This patent is subject to a terminal disclaimer.

(21) Appl. No.: 12/400,058

(22) Filed: Mar. 9, 2009

(65) Prior Publication Data

US 2010/0058883 A1    Mar. 11, 2010

(30) Foreign Application Priority Data

Sep. 8, 2008  (CN) .......................... 2008 1 0304404

(51) Int. Cl.
  *H04M 1/00*  (2006.01)
  *H04M 9/00*  (2006.01)
(52) U.S. Cl. ............ 379/433.12; 379/433.13; 455/575.4

(58) Field of Classification Search ............. 381/433.01, 381/433.11, 433.12, 433.13; 455/575.1, 455/575.2, 550.1; 379/679.23, 679.09, 433.01, 379/433.11, 433.12, 433.13; 74/89.17; 361/679.23, 361/679.09

See application file for complete search history.

(56) References Cited

U.S. PATENT DOCUMENTS

| | | | |
|---|---|---|---|
| 6,782,242 B1 * | 8/2004 | Koleda et al. ................ | 455/90.3 |
| 7,184,806 B2 * | 2/2007 | Bae ............................ | 455/575.4 |
| 7,869,207 B2 * | 1/2011 | Zhang et al. ............... | 361/679.55 |
| 7,962,185 B2 * | 6/2011 | Hung ......................... | 455/575.1 |
| 2006/0016279 A1 * | 1/2006 | Sato et al. ................... | 74/89.17 |

* cited by examiner

*Primary Examiner* — Davetta W Goins
*Assistant Examiner* — Phylesha Dabney
(74) *Attorney, Agent, or Firm* — Altis Law Group, Inc.

(57) ABSTRACT

A sliding mechanism used in a portable electronic device is described. The sliding mechanism includes a body section, a cover section, a rolling disk and a coil spring. The rolling disk is fixed to the cover section. A center of the coil spring is fixed to a center of the rolling disk. An end of the coil spring is fixed to a periphery of the rolling disk. When the rolling disk rotates relative to the body section, the coil spring generates a force towards or against the sliding direction of the cover section.

16 Claims, 5 Drawing Sheets

SLIDING MECHANISM

BACKGROUND

1. Field of the Invention

The present invention relates to sliding mechanisms and, particularly, to a sliding mechanism used in a portable electronic device.

2. Description of Related Art

Slide-type portable electronic device usually includes a main housing, a slidable housing and a sliding mechanism. The sliding mechanism drives the slidable housing to slide with respect to the main housing.

The sliding mechanism usually includes a body section, a cover section and a torsion spring. One end of the torsion spring is fixed to the body section, and the other end of the torsion spring is fixed to the cover section. The cover section can slide relative to the body section by releasing the torsion force of the torsion spring. Due to the main housing and the slidable housing fixed to the body section and the cover section, the slidable housing can slide relative to the main housing.

However, after repeatedly usage, the torsion spring may wear out and thus fail to function properly, thereby degrading the sliding mechanism.

Therefore, there is room for improvement within the art.

BRIEF DESCRIPTION OF THE DRAWINGS

Many aspects of the sliding mechanism can be better understood with reference to the following drawings. These drawings are not necessarily drawn to scale, the emphasis instead being placed upon clearly illustrating the principles of the present sliding mechanism. Moreover, in the drawings like reference numerals designate corresponding sections throughout the several views.

DETAILED DESCRIPTION OF EXEMPLARY EMBODIMENT

Figure 1:
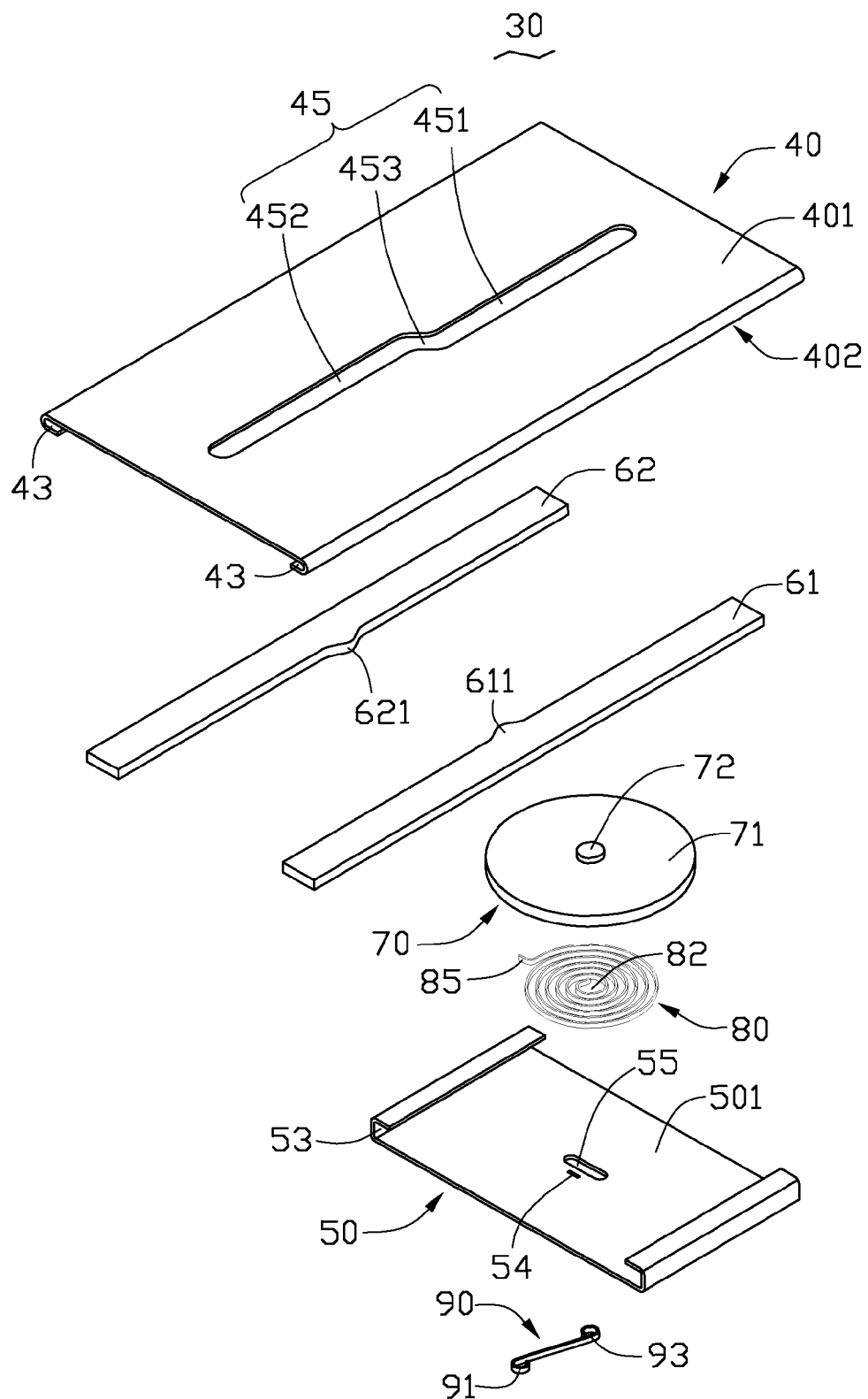
FIG. 1 is an exploded, isometric view of a sliding mechanism, in accordance with an exemplary embodiment.
Figure 2:
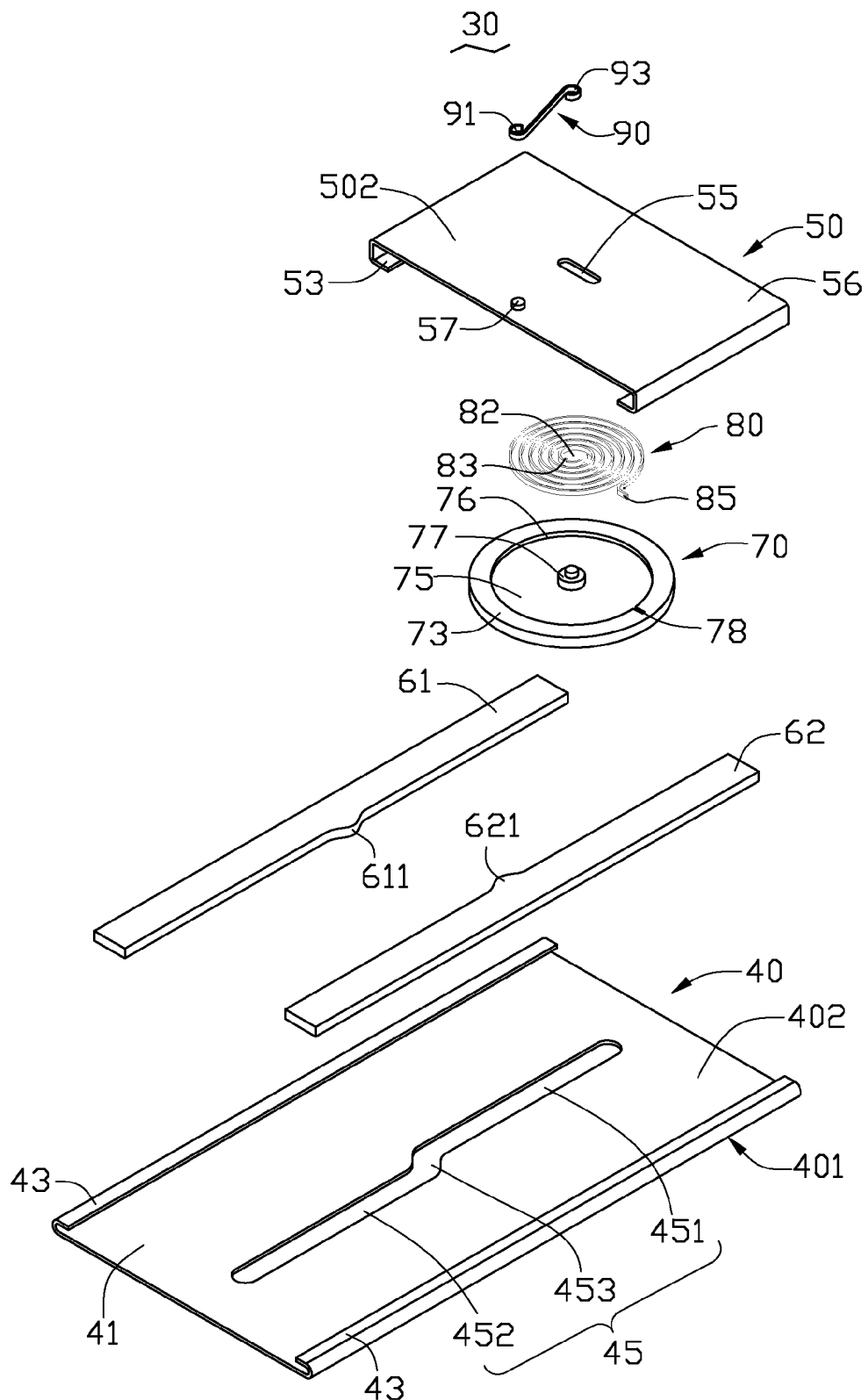
FIG. 2 is another exploded, isometric view of a sliding mechanism, in accordance with an exemplary embodiment.

FIGS. 1 and 2 show an exemplary sliding mechanism 30 for portable electronic devices, such as mobile phone terminals, digital cameras and etc. The sliding mechanism 30 includes a body section 40, a cover section 50, first friction board 61, second friction board 62, a rolling disk 70, a coil spring 80 and an elastic member 90.

The body section 40 includes a top surface 401 and a bottom surface 402. The opposite edges of the body section 40 may be bent inwardly to form two rails 43. The body section 40 defines a sliding slot 45. The sliding slot 45 includes a first slot section 451, a second slot section 452 and a third slot section 453. The third slot section 453 communicates with the first sliding portion 451 and the second slot section 452. The first slot section 451 is substantially parallel with the second slot section 452, but the first slot section 451 is offset to (not coaxial with) the second slot section 452.

The cover section 50 includes a top surface 501 and a bottom surface 502. The two opposite edges of the cover section 50 may be bent inwardly to form two guiding slots 53. The rails 43 are configured to slidably engage into the corresponding guiding slots 53. The cover section 50 defines a sliding groove 55 at a center. A column 57 protrudes from the area near an edge of the bottom surface 502 between the edges forming the guiding slots 53 (see FIG. 2). The cover section 50 further defines a first securing slit 54 on the top surface 501 adjacent to the sliding groove 55.

The first friction board 61 and the second friction board 62 are parallel and symmetrically secured on the bottom surface 402 of the body section 40 on opposite edges of the sliding slot 45. The first friction board 61 has a first protrusion 611 protruding from near a center thereof. The second friction board 62 has a second protrusion 621 protruding from near a center thereof. The two protrusions 611 and 621 protrude toward each other.

The rolling disk 70 is generally circular, including a top wall 71 and a bottom wall 73. A guiding pole 72 protrudes from a center of the top wall 71 (see FIG. 1). Referring to FIG. 2, the bottom wall 73 defines a cavity 75 enclosed by a circular edge 76. A fastening pole 77 protrudes from a center of the bottom wall 73 and is positioned in the cavity 75. The fastening pole 77 is configured to be slidably and partly received in the sliding grooves 55. The circular edge 76 defines a second securing slit 78.

The coil spring 80 is configured to be deformed to generate a torsion force. The coil spring 80 has a hole 82 at its center. The coil spring 80 has a fastening block 83 adjacent to the hole 82 and a fastening end 85 at an end distal to the hole.

The elastic member 90 includes a first fastening portion 91 and a second fastening portion 93 at its opposite ends.

Figure 3:
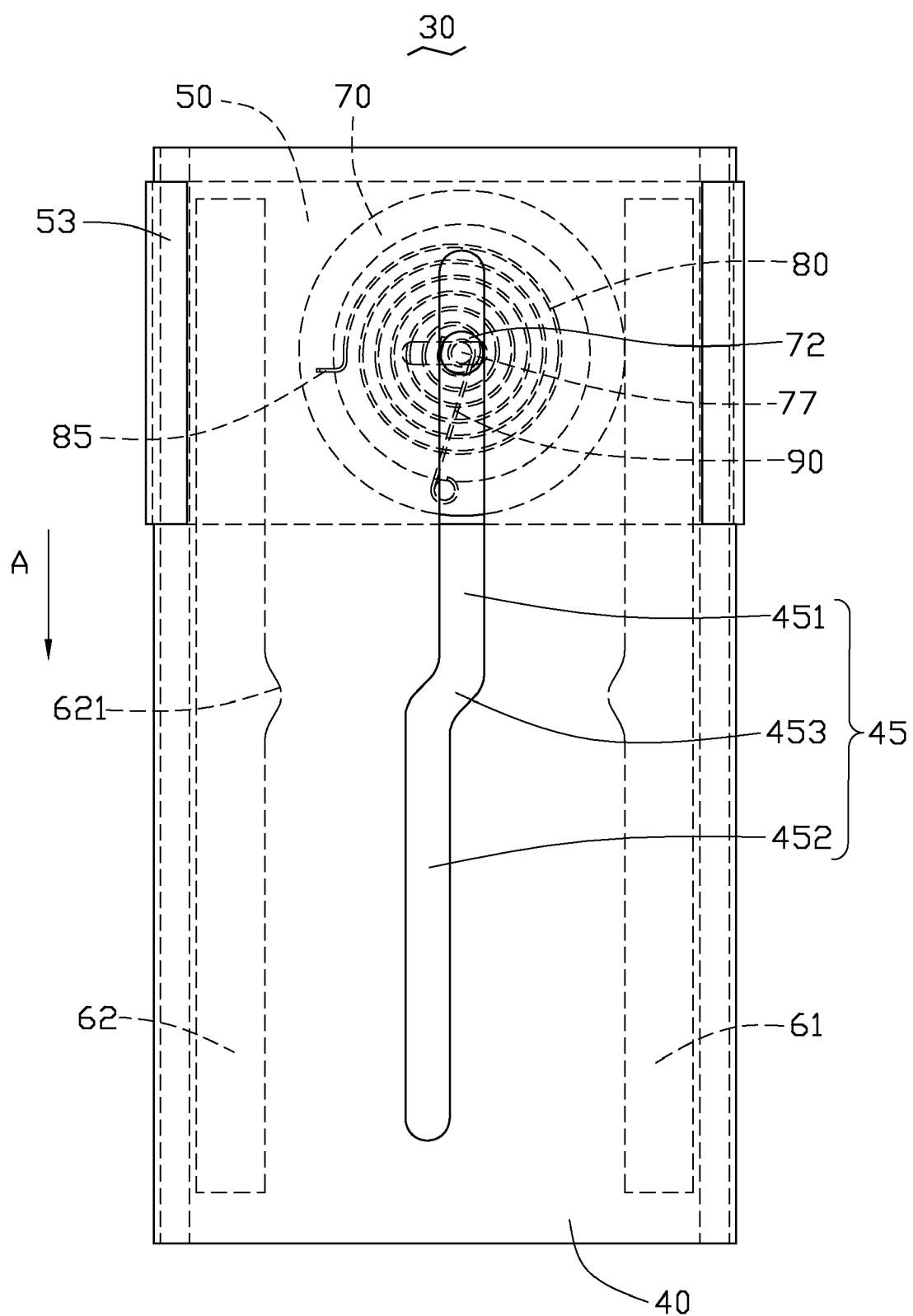
FIG. 3 is a top view of the sliding mechanism shown in FIG. 1 in a closed position, corresponding to an opening/closing operation of the sliding mechanism.

Referring to FIG. 3, the sliding mechanism 30 is in a closed position. In this position, the guiding pole 72 of the rolling disk 70 can be inserted into the first slot section 451 of the sliding slot 45. The rolling disk 70 is rotatably and frictionally engaged with the first friction board 61, and can roll along the first friction board 61. The coil spring 80 is placed into the cavity 75. The fastening pole 77 engages with the elastic member 90 through the hole 82 of the coil spring 80. The fastening block 83 is securely inserted into the first securing slit 54, and the fastening end 85 is securely inserted into the second securing slit 78. The rails 43 slidably engages into the guiding slots 53. The fastening pole 77 engages into and then partially expose through the sliding groove 55. The first fastening portion 91 of the elastic member 90 is secured around the column 57. The second fastening portion 93 is secured around the exposing part of the fastening pole 77. The elastic member 90 is deformed, having a predetermined torsion force to securely attach the rolling disk 70 to the first friction board 61.

Figure 4:
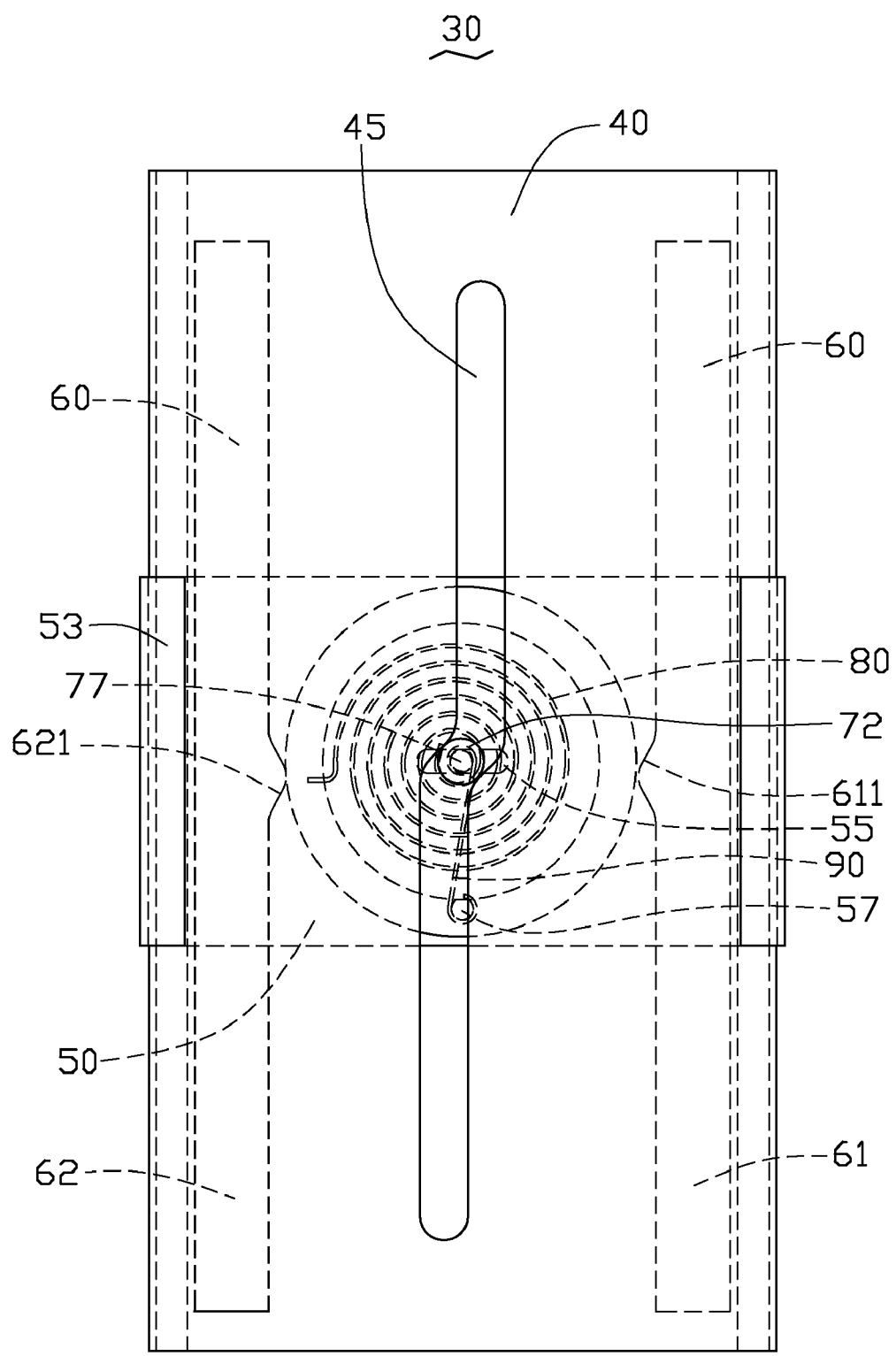
FIG. 4 is a top view of the sliding mechanism shown in FIG. 1 in an intermediate position, corresponding to an opening/closing operation of the sliding mechanism.
Figure 5:
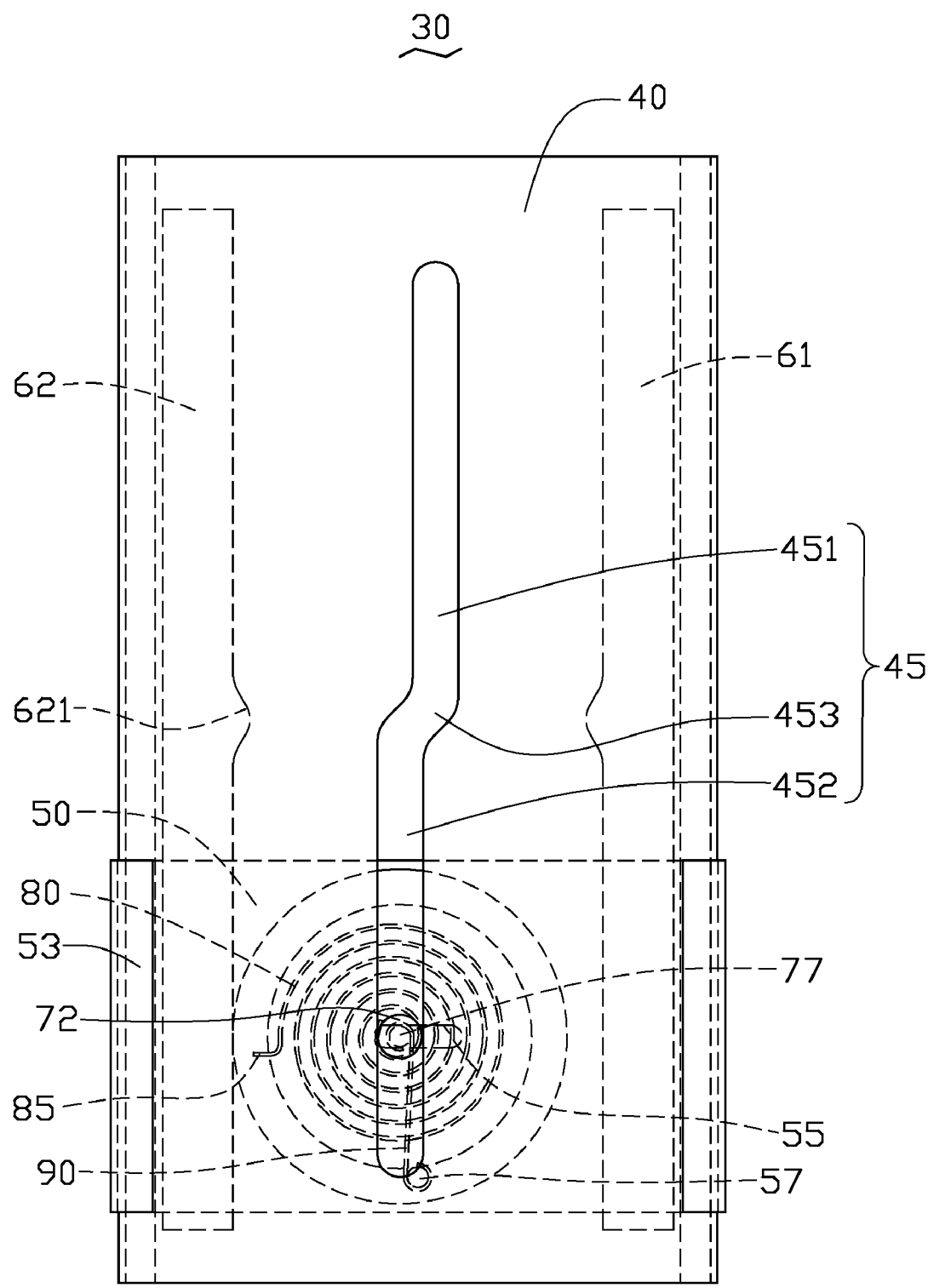
FIG. 5 is a top view of the sliding mechanism shown in FIG. 1 in an open position, corresponding to an opening/closing operation of the sliding mechanism.

FIGS. 3 through 5 show the cover section 50 moving from the closed position to an opened position. The cover section 50 may be pushed to slide along an arrow A from the closed position (shown in FIG. 3) to an intermediate position (shown in FIG. 4). During this stage, the movement of the cover section 50 causes the rolling disk 70 to roll along the first friction board 61. The fastening end 85 of the coil spring 80 pivots the central axis of the coil spring 80 with the rolling disk 70. Thus, the coil spring 80 deforms to contract until the rolling disk 70 abuts against the peak of the first protrusion 611. At this time, the rolling disk 70 also abuts against the peak of the second protrusion 621. The guiding pole 72 of the rolling disk 70 enters into the third slot section 453. Accordingly, the fastening pole 77 moves to a center of the sliding groove 55, thereby further deforming the elastic member 90 to generate an elastic force along arrow A. Meanwhile, the torsion force of the coil spring 80 comes to a maximum level. At this stage, the cover section 50 is in the intermediate position.

By further pushing in the direction of arrow A, the cover section 50 moves from the intermediate position to the opened position. During this stage, the rolling disk 70 further rolls over the peaks of the first protrusion 611 and the second protrusion 621. The second fastening portion 93 of the elastic member 90 swings and thus, the deformed elastic member 90 returns to push the rolling disk 70 toward the second friction board 62 and away from the first friction board 61. After that, the torsion force of the coil spring 80 releases to drive the cover section 50 to automatically slide along the rails 43 to the opened position. The above process can be reversed and the cover section 50 slides from the opened position to the intermediate position, and further to the closed position.

The sliding mechanism 30 can work under the torsion force of the coil spring 80. And the coil spring 80 has a relatively high deformation limit, thus prolonging the lifespan of the whole sliding mechanism 30.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of sections within the principles of the invention to the full extent indicated by the broad general meaning of the terms, in which the appended claims are expressed.

What is claimed is:

1. A sliding mechanism, comprising:
   a body section defining a sliding slot, the sliding slot including a first slot section and a second slot section, the first slot section parallel and offset with respect to the second slot section;
   a cover section slidably mounted to the body section;
   a rolling disk fixed to the cover section, a guiding pole protruding from a center of the rolling disk, the guiding pole slidably received in the sliding slot;
   a first friction board;
   a second friction board, the first friction board and the second friction board parallel secured on opposite edges of the sliding slot; and
   a coil spring, a center of the coil spring fixed to a center of the rolling disk, an end of the coil spring fixed to a periphery of the rolling disk;
   wherein the rolling disk rotates along the first friction board and the coil spring generates a resisting force against the sliding direction when the guiding pole slides along the first slot section to the second slot section; the rolling disk rotates along the second friction board and the coil spring generates a repelling force towards the sliding direction when the guiding pole slides along the second slot section away from the first slot section.

2. The sliding mechanism as claimed in claim 1, wherein the sliding slot further includes a third slot section connecting the first slot section and the second slot section.

3. The sliding mechanism as claimed in claim 2, wherein a first protrusion protrudes from the first friction board, a second protrusion protrudes from the second friction board, the first protrusion and the second protrusion face each other, when the guiding pole enters into the third slot section, the rolling disk abuts against the first protrusion and the second protrusion.

4. The sliding mechanism as claimed in claim 3, wherein the cover section defines a sliding groove perpendicular to the first slot section and having two ends, a fastening pole protrudes from the rolling disk, the fastening pole is slidably received in the sliding groove, whereby when the rolling disk moves from the first slot section to the second slot section through the third slot section, the fastening pole slides from one end of the sliding groove to the other end.

5. The sliding mechanism as claimed in claim 4, further including an elastic member, wherein a column protrudes from the cover section, one end of the elastic member is fixed to the column, the other end is fixed to the fastening pole.

6. The sliding mechanism as claimed in claim 1, wherein the rolling disk defines a cavity used to secure the coil spring therein.

7. The sliding mechanism as claimed in claim 1, wherein a rail is arranged on one of the cover section and the body section, a guiding slot is defined on the other of the cover section and the body section, the rail slidably received in the guiding slot.

8. A sliding mechanism, comprising:
   a body section;
   a cover section slidably mounted to the body section;
   a rolling disk fixed to the cover section; and
   a coil spring, a center of the coil spring fixed to a center of the rolling disk, an end of the coil spring fixed to a periphery of the rolling disk;
   wherein when the cover slides in a sliding direction from a closed position to an intermediate position, the rolling disk rotates relative to the cover body deforming the coil spring to generate a force against the sliding direction; after the cover slides over the intermediate position, the coil spring releases to drive the cover body to automatically slide in the sliding direction to an open position.

9. The sliding mechanism as claimed in claim 1, further comprising a first friction board and a second friction board, wherein the body section defining a sliding slot, the sliding slot includes a first slot section and a second slot section, the first slot section parallel and offset with respect to the second slot section, the first friction board and the second friction board parallel and symmetrically secured on opposite edges of the sliding slot, the rolling disk rotates along the first friction board and the coil spring generates a resisting force against the sliding direction when the guiding pole slides along the first slot section to the second slot section; the rolling disk rotates along the second friction board and the coil spring generates a repelling force towards the sliding direction when the guiding pole slides along the second slot section away from the first slot section.

10. The sliding mechanism as claimed in claim 9, wherein the sliding slot further includes a third slot section connecting the first slot section and the second slot section.

11. The sliding mechanism as claimed in claim 10, wherein a first protrusion protrudes from the first friction board, a second protrusion protrudes from the second friction board, the first protrusion and the second protrusion face each other, when the guiding pole enters into the third slot section, the rolling disk abuts against the first protrusion and the second protrusion.

12. A sliding mechanism, comprising:
   a body section defining a sliding slot, the sliding slot including a first slot section and a second slot section, the first slot section offset with respect to the second slot section;
   a cover section slidably mounted to the body section;

a rolling disk fixed to the cover section, a guiding pole protruding from a center of the rolling disk, the guiding pole slidably received in the sliding slot;

a first friction board parallel secured on an edge of the first slot section;

a second friction board parallel secured on an edge of the second slot section and opposite to the first friction board; and a coil spring, a center of the coil spring fixed to a center of the rolling disk, an end of the coil spring fixed to a periphery of the rolling disk;

wherein the rolling disk rotates along the first friction board and the coil spring generates a resisting force against the sliding direction when the guiding pole slides along the first slot section to the second slot section; the rolling disk rotates along the second friction board and the coil spring generates a repelling force towards the sliding direction when the guiding pole slides along the second slot section away from the first slot section.

13. The sliding mechanism as claimed in claim 12, wherein the sliding slot further includes a third slot section connecting the first slot section and the second slot section.

14. The sliding mechanism as claimed in claim 13, wherein a first protrusion protrudes from the first friction board, a second protrusion protrudes from the second friction board, the first protrusion and the second protrusion face each other, when the guiding pole enters into the third slot section, the rolling disk abuts against the first protrusion and the second protrusion.

15. The sliding mechanism as claimed in claim 14, wherein the cover section defines a sliding groove perpendicular to the first slot section and having two ends, a fastening pole protrudes from the rolling disk, the fastening pole is slidably received in the sliding groove, whereby when the rolling disk moves from the first slot section to the second slot section through the third slot section, the fastening pole slides from one end of the sliding groove to the other end.

16. The sliding mechanism as claimed in claim 15, further including an elastic member, wherein a column protrudes from the cover section, one end of the elastic member is fixed to the column, the other end is fixed to the fastening pole.

\* \* \* \* \*